Patented May 12, 1936

2,040,249

UNITED STATES PATENT OFFICE 2,040,249

RETARDING STALING OF YEAST LEAVENED BREAD

Albert K. Epstein and Benjamin R. Harris, Chicago, Ill., assignors to Standard Brands, Incorporated, New York, N. Y., a corporation of Delaware No Drawing. Application November 15, 1933, Serial No. 698,164

6 Claims. (Cl. 99—90)

Our invention relates to a process for preventing the staling of yeast leavened bread and the bread product resulting from the use of the process.

The principal object of our invention is to prevent the staling of yeast leavened bread.

Another object is the utilization of materials to prevent staling of yeast leavened bread which will not be objectionable from the standpoint of either toxicity, taste, or odor.

Another object is the production of yeast leavened bread which will resist staling.

We have discovered that if xylose is used in suitable quantities and in a proper manner in yeast leavened bread in preparing the dough batch, the resulting baked load will resist staling for a longer period of time than yeast leavened bread produced by processes and employing products heretofore known. The xylose may, of course, be introduced in several manners, but should be uniformly distributed throughout the dough batch.

For commercial purposes, we take, for example, 50 lbs. of xylose and distribute it in 50 lbs. or more of a suitable dry material normally used in the manufacture of yeast leavened bread. Flour, starch and sodium chloride may be used in this manner as diluting agents. In carrying out the process, therefore, we proceed as follows:

The xylose being mixed with an equal quantity of filler material such as flour, the bread dough batch is made in the ordinary way and, at a suitable time during the mixing, 1 lb. of the material of our invention is added for each 100 lbs. of flour used in the dough batch. If a larger proportion is desired, two or three pounds of the mixture may be used. In general, we find that not more than 3 lbs. of the xylose should be used per hundred pounds of flour in any dough batch and, for the most part, considerably smaller quantities such as ½ lb. produce good results.

The bread is baked in the ordinary way, and the resulting loaf will remain fresh for a considerably longer period of time than the ordinary commercial yeast leavened bread.

What we claim as new and desire to protect by Letters Patent of the United States is:

1. A bread dough batch including flour, aqueous material, yeast as a leavening agent, and approximately one-half per cent of xylose.

2. A composition of matter adapted to be used for preventing the staling of bread comprising xylose and a diluting material of the class consisting of flour, starch, and sodium chloride.

3. An improved bread adapted to resist staling, having as a constituent thereof a relatively small amount of xylose.

4. A composition of matter adapted to be used for preventing the staling of bread containing xylose and a material normally used in the manufacture of yeast leavened bread.

5. A bread dough batch including flour, aqueous material, xylose, and yeast as a leavening agent.

6. The method of preventing the staling of yeast leavened bread which comprises dispersing xylose in a dough batch with flour, aqueous material and yeast as a leavening agent, forming the dough batch into loaves, and baking the loaves.

ALBERT K. EPSTEIN.
BENJAMIN R. HARRIS.